April 6, 1954  H. J. KAYE  2,674,046
MEASURING DEVICE
Filed April 3, 1950
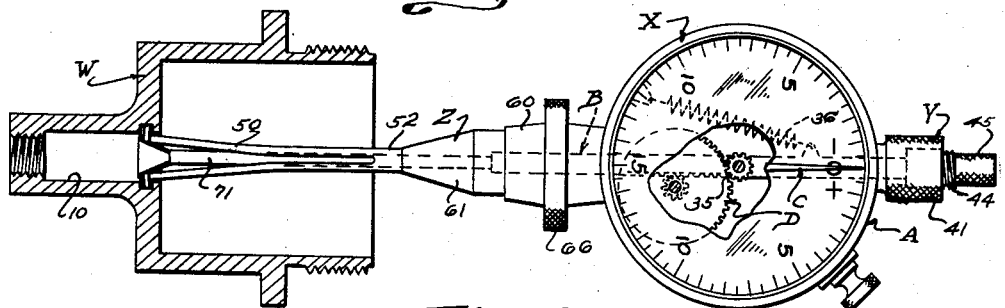
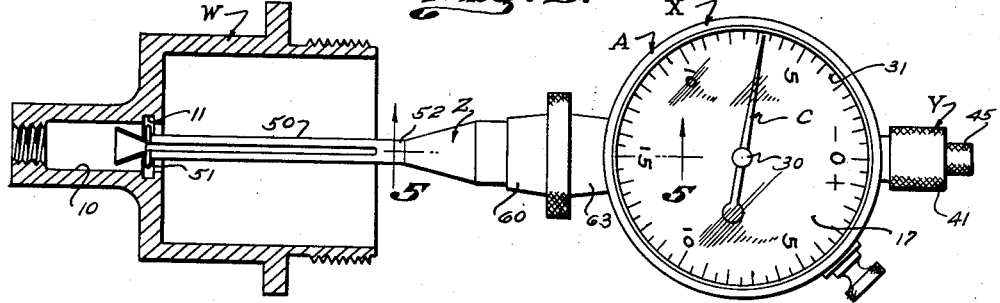
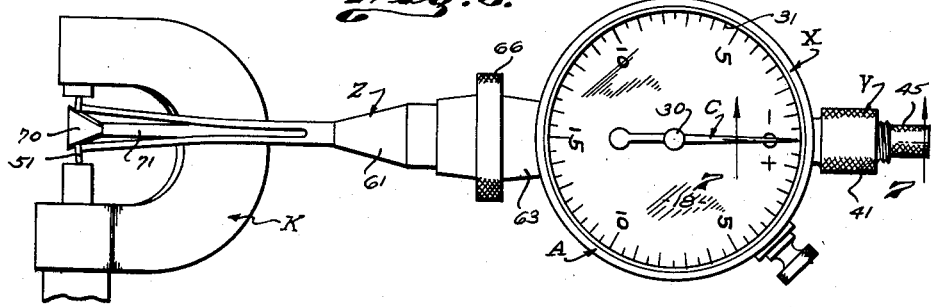
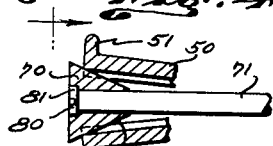
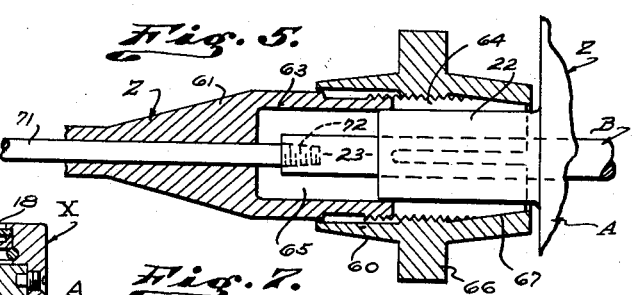
INVENTOR.
Harold J. Kaye
BY
Attorney

UNITED STATES PATENT OFFICE 2,674,046

MEASURING DEVICE

Harold J. Kaye, Los Angeles, Calif.

Application April 3, 1950, Serial No. 153,725

3 Claims. (Cl. 33—178)

This invention has to do with a measuring device or instrument and it is a general object of the invention to provide a simple, accurate, easily operated device useful for measuring holes, grooves or openings generally, and particularly practical for measuring undercuts, grooves or recesses such as may occur in the walls of holes or bores.

In various machines of manufactures undercut recesses or cavities are provided or required and in many cases it is extremely difficult to accurately engage or measure such recesses. For example, numerous machine made products that are turned or bored have drilled or bored holes with undercut recesses or cavities in the walls thereof. It is necessary or desirable for the workmen producing such elements or structures and for inspectors, etc., to measure or gauge such recesses or undercuts and with ordinary instruments or measuring equipment such operations are generally slow, difficult and not always accurate if they are at all practical.

It is a general object of this invention to provide an instrument applicable to a recess or cavity and contractible for removal therefrom and then subject to operation so it can be measured to give the exact dimension of the recess or cavity.

A general object of the present invention is to provide an instrument of the general character referred to which is readily applicable to and from a cavity or undercut recess and which when removed from such recess can be easily and quickly re-established in exactly the same position that it was in when within the recess, thus providing a means of accurate measurement.

Another object of this invention is to provide an instrument of the general character referred to involving few simple, dependable parts that are easy to operate and which are exceedingly accurate in operation.

A further object of the present invention is to provide an instrument of the general character referred to including an indicating unit having an indicating hand or the like showing the relative positioning of the parts of such unit, the unit being operated by a screw means and having a work engaging element projecting therefrom movable into and out of engagement with the work, as for instance, the walls of a recess or undercut which is to be measured.

It is a further object of this invention to provide an attachment applicable to an indicating unit which attachment provides for simple, quick, accurate operation of the indicating unit and also for engaging or feeling work where the work is to be measured.

The device of the present invention provides, in general, an indicating unit, means for operating the indicating unit, and work contacting or engaging means related to and operating in connection with the indicating unit. In accordance with one aspect of the present invention the work indicating unit may serve as a device or structure to which the other elements are applied as attachments, whereas, in accordance with another aspect all of the above mentioned elements cooperate to form one single machine.

The indicating unit may be a simple structure involving, generally, a case-like body, a bar carried by and reciprocating relative to the body, and an indicator showing the position of the bar relative to the body. In the preferred form the body has a boss-like projection on its exterior and the ends of the bar project from the exterior of the body, one through said boss-like projection. The indicator may involve a hand cooperating with a suitable scale or graduations and the hand may be operated from the bar as through bearing. A means such as a spring normally yieldingly urges the bar in one direction.

Operating means for the bar is provided at one end thereof, preferably at the end remote from the boss-like projection of the body, and this means may involve an extension of the bar threaded thereto and having an operating collar threaded thereon and engaging the body. The means provided for engaging the work to be measured involves a pair of relatively movable arms with laterally projecting fingers at the outer ends thereof. Means releasably connects the inner end portions of the arms with or to the boss-like projection of the body and this mounting means preferably includes a screw actuated clamp mechanism. A member is connected to the end of the bar projecting from the boss-like projection of the body, as by means of a stem, and in the preferred form this member or part is in the nature of a wedge and engages the arms so that when the bar is moved relative to the body the arms are moved relative to each other. In the preferred structure the arms are spring arms normally in retracted relationship and the wedge part acts between the arms to spread them apart. In operating the structure it is manipulated with the arms retracted to a position where the fingers are in register with the cavity or undercut to be measured. The operating means is then actuated to cause spreading of the arms until the fingers enter the recess or undercut to feel the walls thereof. The position of the bar relative to the body is then observed by reading the indicator whereupon the actuating means is operated so that the fingers are withdrawn from the undercut enabling the instrument to be separated from the work being measured. When removed the operating means is again actuated to bring the parts to exactly the same position that they were in when the fingers were in the undercut feeling the walls thereof. With the instrument thus set the spacing of the finger tips can be readily measured as by calipers, a micrometer or other device, thus enabling the user to ascertain the exact dimension of the undercut.

The various objects and features of my invention will be fully understood from the following detailed description of a typical preferred form and application of the invention, throughout which description reference is made to the accompanying drawings, in which:

Fig. 1 is a view of an instrument embodying the present invention showing it in connection with a typical unit of work and with the fingers of the instrument engaged in an undercut in the work to feel the walls of the undercut, parts of the instrument being broken away to show in section. Fig. 2 is a view similar to Fig. 1 showing an instrument operated to a position where the fingers are free of the undercut enabling the instrument to be separated from the work. Fig. 3 is a view similar to Fig. 1 showing the instrument operated from the position shown in Fig. 2, and re-established in exactly the same position that it was in when in the work, as shown in Fig. 1, and showing the distance between the tips of the fingers being measured by a suitable measuring device. Fig. 4 is an enlarged longitudinal detailed sectional view of the portion of the instrument that engages in the work. Fig. 5 is an enlarged longitudinal detailed sectional view taken substantially as indicated by line 5—5 on Fig. 2. Fig. 6 is an enlarged end view of the parts shown in Fig. 4, being a view taken as indicated by line 6—6 on Fig. 4, and Fig. 7 is an enlarged detailed sectional view taken as indicated by line 7—7 on Fig. 3.

The instrument provided by this invention can be used in connection with or for measuring various parts or devices and for purpose of illustration a typical and simple arrangement of work W is illustrated in the drawings and the work there shown has a bore 10 with an undercut groove or recess 11 therein. This particular structure is shown merely for purpose of illustration or example and the instrument of the present invention will be described as used and operated for measuring the size or depth of the undercut recess 11.

The instrument of the present invention involves, generally, an indicating unit X, operating means Y, and work engaging means Z.

The indicating unit X may vary widely in form and construction and in the preferred embodiment of the invention it is preferably a single mechanism involving generally a body A, a bar B carried by the body to shift or reciprocate relative thereto, an indicator C visible from the exterior of the body, and operating means or a drive D between the bar and the indicator. In the particular case illustrated the body A is a simple case or housing construction having a cylindrical side wall 15, a bottom 16, a rotatable top 17, and a transparent closure 18 over the top movable therewith. The bar B which may be a simple straight elongate element is preferably carried by the body A to extend diametrically thereof and in the case illustrated a boss or bearing 20 is provided at one side of wall 15 to slidably carry one end portion 21 of the bar while a boss-like projection 22 projects from the exterior of the wall 15 diametrically opposite boss 20 to slidably carry the end portion 23 of the bar. The bar is of such length that its end portions project from or beyond the body A or the parts thereof to be accessible or engageable at the exterior of the body.

The indicator C is shown as a hand pivotally supported at 30 so that it is located immediately above the top 17 of the body and it is cooperatively related to a scale or graduations 31 provided on the upper or visible side of the top. The scale or graduations 30 is visible through the transparent cover 18. The drive between the bar B and indicator C may be any suitable drive serving to show or indicate the position of the bar relative to the body. In the particular case illustrated a suitable train of gears 35 operatively connects the bar and the indicator. A spring 36 preferably a tension spring, is carried in the body and is connected between the body and bar so that it normally yieldingly urges the bar in one direction. In the particular case illustrated the spring urges the bar toward the side of the wall 15 from which the boss-like projection 22 extends.

The operating means Y is provided at the exterior of body A and forms a means for conveniently and accurately operating the bar relative to the body. In the preferred form the means Y involves an extension 40 of the end portion 21 of the bar and an operating collar 41 carried by the extension 40 and cooperatively engaging the body A. In the particular case illustrated the extension 40 is releasably connected to the outer or terminal end of end portion 21 of bar B as by a suitable screw fastener 42. The inner portion 44 of the extension 40, that is, the portion adjacent the bar B, is externally threaded while the outer portion 45 of the extension forms a handle and in practice may be suitably finished, for instance, it may be knurled or otherwise finished or fashioned so that it forms a convenient handle. The operating sleeve 41 is threaded on the portion 44 of the extension 40 and its inner end 46 abuts the exterior of body A, for instance, it may engage the outer side of wall 15 of the body. It will be apparent, particularly from Fig. 7 of the drawings, how the sleeve 41 can be rotated to shift the bar B relative to case A against the resistance of the spring 36, and it will be observed that the spring 36 serves to at all times hold the end 46 of the collar 41 in bearing or pressure engagement with the body unless the bar is deliberately operated against the resistance of the spring as by a deliberate operation intended for this purpose.

The means Z for engaging the work to be measured includes, generally, two cooperating or relatively movable elements, one involving a pair of relatively movable arms with work engaging fingers thereon and the other a part, preferably a wedge engaging the arms to operate them relative to each other. In accordance with the invention one of the elements of means Z is attached to and carried by the body A while the other is attached to and is operated by the bar B.

In the form of the invention shown in the drawings there is a pair of arms 50 with outwardly or laterally projecting work engaging fingers 51 on their outer ends and the inner end portions of the arms which are joined together at 52 are secured to the case A by a suitable mounting means 60. The mounting means 60 serves to releasably mount the arms 50 on the body A by or through the boss 22 (Fig. 5). In the form of the invention illustrated the mounting means involves an enlargement 61 that may be integral with the inner ends of the arms or with the arm structure where the arms join. A sleevelike extension 63 has a longitudinally split portion 64 slidably engaged over boss 22 and is of such length as to provide a chamber 65 beyond the outer end of the boss 22 and accommodating the end portion 23 of the bar. A threaded clamp 66 is provided to operate the split portion of sleeve 63 so it is clamped onto the boss. The clamp 66 is shown threaded onto the exterior of the sleeve portion and the sleeve and clamp have cooperating inclined or wedge parts 67 which cause the sleeve to be contracted onto the boss when the clamp is threaded along the sleeve.

The part or element that engages and operates the arms relative to each other is shown as involving a head or wedge 70 engaged with the outer end portions of the arms 50, and carried by a stem 71. The stem is releasably attached to the terminal end of the bar portion 23 as by a threaded connection 72. The stem 71 extends parallel with the bar B and between the arms 50 and it preferably carries the wedge head 70 so that the head is between the end portions of the arms which carry the fingers 51. The wedge head has beveled or inclined wedge faces 75 on which the end portions of the arms are engaged. In the preferred form of the invention the arms 50 are spring members normally substantially parallel as shown in Fig. 2, and the wedge head 70 can be positioned as shown in Fig. 2, so that it allows the arms 50 to assume the normal retracted position there illustrated. As the bar B is moved relative to body A, for instance, as the means Y is operated so that the wedge head 70 is moved toward or between the arms, the wedge faces 75 of the wedge head 70 coact with the end portions of the arms 50 causing the arms to be spread apart. As this operation occurs the indicator C operates with reference to the graduations or scale 30 to show or indicate the position of the bar B relative to body A.

In accordance with the present invention it is contemplated that the elements of means Z be easily and quickly detachable from the parts of the indicating unit X so that means Z of different sizes or possibly of somewhat different types may be substituted as different types, sizes, or classes of work are to be measured. From the foregoing description it will be apparent how operation of clamp 66 permits of the arm element being readily attached to and removed from unit X and it will be apparent from the drawings how a screw driver or the like applied to the outer end 80 of stem 71 can be operated to engage or release the stem relative to the bar. In the particular case illustrated the head 70 rotatably passes the stem 71 and an enlargement 81 on the outer end of the stem provided with a screw driver slot, or the like, retains the head on the stem.

To operate the structure provided by the present invention an indicator unit X equipped with an operating means Y has work engaging means Z applied thereto of a size or type that will properly operate in connection with the work W to be measured. In the drawings I show a means Z of a size and type designed to measure an undercut 11 such as is shown in the work W and which is the element that I refer to as being measured. With the operating means Y positioned so that the arms 50 are retracted the instrument is applied to the work W in the manner shown in Fig. 2 of the drawings, whereupon the operating means Y is actuated causing the fingers 51 to be moved outwardly until they engage in or fill the wall of the undercut 11. When the fingers are properly engaged in the undercut as shown in Fig. 1 the indicator C can be observed to ascertain the exact position of the bar B relative to the body A. In a case such as is illustrated in the drawings, where the top 17 carries the graduations or scale 31 and is rotatable or shiftable relative to the indicator C, the top can be positioned so that the indicator shows a reading of zero (see Fig. 1). The means Y is then actuated so that the elements of means Z return to a position such as is shown in Fig. 2, enabling the instrument to be withdrawn from the work W. When the instrument is clear of the work W the means Y is again operated to return the fingers to the position shown in Fig. 1, and they can be very accurately moved to that position by actuation of means Y while the indicator C is carefully observed. With the instrument detached from the work and the fingers returned to the position that they were in when measuring engagement with the work, any suitable measure or measuring device can be employed to ascertain the spacing of the tips of the fingers. It Fig. 3 of the drawings I show a typical measuring instrument K being used for this purpose. By operating the instrument as just described the size or dimension of the undercut can be accurately ascertained and it will be apparent that with the instrument it is also possible to operate it in an undercut in such manner as to check as to whether or not the undercut is truly round or is out of round. It will be readily understood by those familiar with the art how the instrument can be used or manipulated so that the fingers 51 accurately feel the wall or surface of the undercut in a manner similar to that employed when a measuring instrument K is applied to the fingers, as shown in Fig. 3 of the drawings.

From the foregoing description it will be apparent that the indicating unit X employed in carrying out the invention may be a standard or typical indicating device in which case the means Y and Z, as provided by the present invention, may be applied to the unit X as an attachment.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. An attachment for an indicating unit having a body with a boss thereon, a bar shiftable relative to the body with its ends projecting from the exterior of the body, one of the ends extending through the boss, and an indicator showing the position of the bar relative to the body including, an extension releasably attached to the other end of the bar, an actuator threaded to the extension and engaging the body to shift the bar relative to the body when rotated, a pair of normally straight substantially parallel flexible arms with work engaging fingers at their outer ends projecting laterally outward from the arms, means releasably securing the inner end portions of the arms to the boss, a straight rigid stem smaller in diameter than the bar, means releasably attaching one end of the stem to the first mentioned end of the bar with the stem in line with the bar and so the stem projects from the bar and between the arms and beyond the outer ends of the arms, and a member on the other end of the stem normally beyond the outer ends of the arms and adapted to be engaged between the arms and to spread the fingers apart when the bar is moved toward the body, the distance between the extremities of the fingers being greater than that between the extremities of the arms.

2. An attachment for an indicating unit having a body with a boss thereon, a bar extending through the body and shiftable relative to the body with its ends projecting from the exterior of the body one through the boss, and an indicator showing the position of the bar relative to the body including, an extension releasably attached to the other end of the bar, an actuator threaded to the extension and engaging the body to shift the bar relative to the body when rotated, a pair of long slender normally straight spring arms with laterally projecting work engaging fingers at their outer ends and projecting in opposite directions from the arms, screw actuated clamp means releasably securing the inner end portions of the arms to the boss, a straight rigid stem smaller in diameter than the bar, means releasably attaching the stem to the first mentioned end of the bar so the stem is in line with the bar and projects therefrom and between the arms and beyond the outer ends thereof, and a wedge on the stem normally outward of the arms and adapted to be engaged between the arms to shift them relative to each other when the bar is moved relative to the body to move the stem toward the body, the distance between the tips of the fingers being greater than that between the extremities of the arms.

3. An instrument of the character described including, a body defining a case, two elongate elements slidably related to reciprocate longitudinally relative to each other, one of said elements being fixed relative to the case and projecting therefrom and the other being shiftable relative to the case and projecting therefrom, and means carried by the case adapted to reciprocate the elements relative to each other and to indicate the relationship of elements relative to each other, one element having a pair of spaced slender substantially parallel spring arms projecting therefrom and parallel therewith, the arms having oppositely projecting fingers projecting laterally from their terminal ends, and the other element having a slender stem between and substantially coextensive with the arms, and having a wedge on its terminal end normally outward of the terminal ends of the arms and adapted to spread the finger-carrying portions thereof apart when the head is reciprocated inwardly relative to the arms.

References Cited in the file of this patent

UNITED STATES PATENTS

| Number | Name | Date |
|---|---|---|
| 842,044 | Wells et al. | Jan. 22, 1907 |
| 857,810 | Kohlhaas | June 25, 1907 |
| 953,282 | Nash | Mar. 29, 1910 |
| 1,631,019 | Darlington | May 31, 1927 |
| 1,656,180 | Eisele | Jan. 17, 1928 |
| 2,335,775 | Laughton | Nov. 30, 1943 |
| 2,404,751 | Schmitt | July 23, 1946 |
| 2,472,875 | Adams | June 14, 1949 |

FOREIGN PATENTS

| Number | Country | Date |
|---|---|---|
| 327,995 | Germany | Oct. 20, 1920 |
| 546,843 | Great Britain | July 31, 1942 |